United States Patent [19]
Burrington

[11] Patent Number: 4,564,223
[45] Date of Patent: Jan. 14, 1986

[54] HOSE COUPLING

[75] Inventor: George C. Burrington, Cleveland, Ohio

[73] Assignee: Parker-Hannifin Corporation, Cleveland, Ohio

[21] Appl. No.: 490,630

[22] Filed: May 2, 1983

[51] Int. Cl.⁴ ............................................. F16L 33/20
[52] U.S. Cl. ...................................... 285/256; 285/286
[58] Field of Search ................... 285/256, 259, 12, 286

[56] References Cited

U.S. PATENT DOCUMENTS

| | | | |
|---|---|---|---|
| 2,273,398 | 2/1942 | Couty et al. | 285/259 X |
| 2,464,416 | 3/1949 | Raybould | 285/259 X |
| 2,797,111 | 6/1957 | Beazley | 285/256 X |
| 3,325,194 | 6/1967 | Grawey | 285/257 |
| 3,347,571 | 10/1967 | New | 285/256 X |
| 3,367,683 | 2/1968 | Mattson | 285/243 |
| 3,649,050 | 3/1972 | Woodling | 285/12 |
| 4,150,466 | 4/1979 | Horvath | 285/256 X |
| 4,366,841 | 1/1983 | Currie et al. | 285/256 X |

Primary Examiner—Dave W. Arola
Attorney, Agent, or Firm—Joseph B. Balazs

[57] ABSTRACT

A permanently attachable coupling for high pressure multiple layer wire reinforced hydraulic hose in which the grip on the hose is achieved by the penetration of plural gripping teeth through the cover of the hose directly into engagement with the wire reinforcement. The coupling includes an overlapped shell arrangement in the region of at least one gripping tooth to provide a deeper penetration of that tooth into the reinforcement structure when the shell is crimped into engagement with the hose. The nipple structure of the coupling includes an annular gripping ridge in the region of the overlap which produces a pincer-like grip upon the hose.

21 Claims, 2 Drawing Figures

HOSE COUPLING

BACKGROUND OF THE INVENTION

This invention relates to permanently attachable hydraulic hose couplings and more particularly to a crimp type coupling particularly suited for high pressure, multiple wire ply hoses.

The high pressure hose coupling field has received much attention in the past but currently is even more emphasized in the need for higher pressure requirements in large size hoses. In particular it is desirable to be able to obtain a reliable junction between the hose and coupling in a satisfactory manner and to be able to achieve such connection in a field environment which will duplicate that type of connection which might be made in a factory assembly. Still further it is desired to make such a connection in which no special preparation is required upon the hose such as skiving the outer cover or core tube.

Two types of hose couplings are currently in commercial use in the high pressure environment of six spiral wire reinforced hose. One of these is described for example in U.S. Pat. No. 3,325,194. In this example, the outer cover of the hose must be removed or skived in order to achieve a suitable connection. In this arrangement a collet-type grip is achieved directly on the wire reinforcement when an outer sleeve is axially forced over axial split collet fingers which include internal gripping grooves therein. This type of coupling is reusable but includes the disadvantages of difficult to manufacture components and a difficult to assemble structure wherein separable components must be provisionally placed on a hose end in a proper orientation and then pressed into engagement with one another. The chief drawback however, is the requirement for skiving the cover of the hose.

Skiving is conventionally performed as an abrading process by a grinding wheel or the like where the hose must be supported and rotated in relation to the rotating wheel as well as being moved relative thereto to effect the proper depth of removal of material. Skiving is a difficult process, best performed in a factory environment where close control can be maintained. In the field, inconsistent results often result, for example, where the cover is unevenly removed or even worse when the reinforcement is damaged. These effects result in inconsistent hose joints, which are especially noticeable in high pressure applications where such deviation cannot be tolerated. Skiving is a difficult, dirty, costly and inconsistent process but has been found to be necessary in current practice to achieve high pressure joints in the larger size hoses.

Another example of current practice is described in U.S. Pat. No. 3,347,571. Here, in order to achieve a satisfactory grip upon the hose, both the outer cover and the core tube of the hose are skived so that a direct grip on the reinforcement structure can be made by the crimped shell and nipple of the coupling. Skiving the core tube is even more difficult than skiving the cover and even less control can be exercised over the process where damage to the reinforcement or removal of insufficient amounts cannot be readily viewed.

When a hose structure is skived, exposing the reinforcement, it is very common to have individual wire strands unwind from the hose structure. These strands are extremely stiff and make assembly of the hose joint prior to crimping, very difficult.

Skiving then, is a process which has been developed in an attempt to achieve high performance for critical coupling applications. There are prior art couplings in which high performance is attempted to be achieved in no-skive arrangements where direct engagement is made with the reinforcement structure of the hose through the retained cover member. One example of this is U.S. Pat. No. 3,367,683 wherein a sturdy clamp structure is employed to drive gripping teeth into engagement with the reinforcement. This structure is costly and unwieldy and can be subject to inconsistent results, dependent upon the skill of the assembler and the proper assembly of the individual components.

Another form of prior art device is shown in U.S. Pat. No. 4,150,466 wherein a particular form of barb is utilized in order to achieve penetration of the hose cover and engagement with the reinforcement. A plurality of sharp penetrating barbs is described, with penetration substantially into the reinforcement structure. This disrupts the integrity of the reinforcement and may produce attendant possible damage to the structure. The grip is achieved with a pointed, relatively small profile, distributed structure, which is of a difficult to manufacture, pyramid shape.

Another form of no-skive coupling which avoids penetration of gripping teeth into the reinforcement structure is shown in U.S. Pat. No. 4,366,841. In this type of coupling in which the grip is also achieved by crimping the collar of the coupling, the gripping teeth are designed to accommodate the high crimp forces by bending upon engagement with the wire reinforcement. These gripping teeth are specially shaped for this purpose and are relatively slender in profile.

SUMMARY OF THE INVENTION

The hose coupling of this invention is suitable for high pressure ranges in large coupling sizes, primarily where several layers of wire reinforcement are used in the hose structure. Coupling is made directly to the wire reinforcement structure by a series of annular rings on the inner periphery of the coupling sleeve. The gripping rings are caused to penetrate the hose cover when the coupling sleeve is crimped upon the hose. A stacked shell structure is used for the coupling sleeve so that an inner gripping ring is forced further radially inward than outer gripping rings. An annular ridge on the outer periphery of the coupling nipple in the vicinity of the inner gripping ring on the sleeve cooperates therewith to provide a pincer-grip upon the hose reinforcement. Sealing of the hose structure is effected primarily at the axially outer portions of the nipple in cooperation with the gripping force provided by the remainder of the gripping rings.

With the hose coupling of this invention, the hose joint may be made through the cover of the hose, obviating the necessity for skiving or removal of the cover or even the core tube of the hose. The hose is presented merely with a square-cut end, is readily slipped into the coupling in the annular space provided and bottomed therein. Crimping of the hose collar in conventional apparatus for this purpose is facilitated in that the hose and coupling assembly are readily handled and are not required to be precisely aligned in the crimping apparatus as the grip upon the hose is inherently achieved by radial compression of the hose collar in a manner predetermined by the collar structure.

DESCRIPTION OF THE INVENTION

Figure 1:
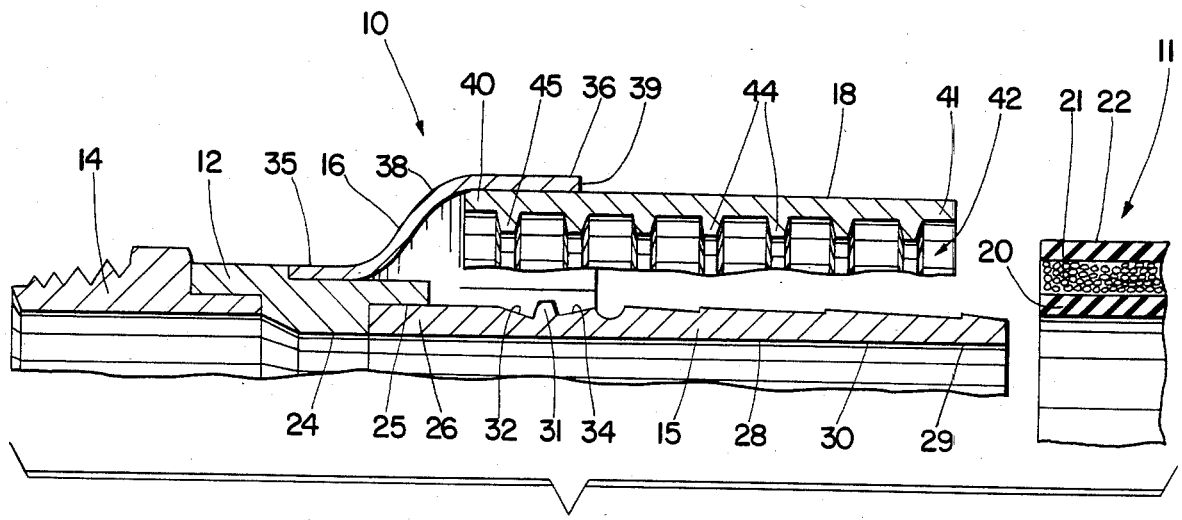
FIG. 1 is a sectional view of the coupling of the invention with parts broken away, shown in relation to the end portion of a hose to be coupled therein.

Referring now to FIG. 1 the coupling 10 is shown in relation to the end portion of a length of hose 11 to which the coupling is to be affixed. The coupling consists of body member 12, adapter 14, nipple 15, first shell 16 and second shell 18.

Hose 11 is a very high pressure flexible conduit consisting of elastomeric core tube 20, reinforcement 21 and elastomeric cover 22. The hose 11 is known in the trade by the designation spiral hose 100R13 and consists of a construction in which the reinforcement 21 comprises six layers of wire laid in spirals over one another and over the core tube 20. Core tube 20 is an oil resistant synthetic rubber or elastomer as is cover 22. Typical specifications for a hose 11 of this type and thus for the coupling 10 as well, in the 2 inch size of hose ID, are an operating pressure of 5000 psi, proof pressure of 10,000 psi and burst pressure of 20,000 psi.

Coupling 10 consists of components, which for the most part, are machined from steel and assembled as an integral unit for receipt of a hose end. The coupling 10 is designed primarily for use in field crimp applications, that is, in applications in which hose assemblies are made or repaired in other than a factory controlled environment. By crimping is meant the radial contraction of the shells 16,18 toward the axial centerline of the coupling 10, by equipment which typically comprises a set of collet-like dies or the like which are in engagement with the shells and which are caused to be moved into a tapered bowl to thus be radially contracted. Typically hydraulic power is used for the crimp operation and in the instance of the two inch coupling mentioned, such force requirement might be on the order of 100 tons.

Body member 12 of coupling 10 is a generally tubular structure having a central passage 24 therein and as depicted in the drawings includes notch 25 at the outer end thereof in which is received the inner end 26 of nipple 15. The inner end 26 is secured to body member 12 by brazing or the like or alternatively body member 12 and nipple 15 could be a unitary structure machined from a common length of stock material.

Nipple 15 is also a tubular structure having center portion 28, free end 29 and bore 30, the latter being generally coaxial and in fluid communication with passage 24 in body member 12. Nipple 15 includes annular ridge 31 near the inner end 26 thereof and annular grooves 32,34 on either side of ridge 31. The outer periphery of nipple 15 is the sealing surface thereof and is adapted to be placed into intimate contact with inner core 20 of hose 11 upon crimping of coupling 10, to be described in greater detail hereinafter. Adapter 14 is also secured to body member 12 in a fluid tight manner, as by brazing or the like, being received in a notch at the inner end of body member 12. Adapter 14 may take many different configurations depending upon applications, but is designed to connect coupling 10 to a system in which fluids are being transmitted. In the embodiment depicted adapter 14 is a tubular member having a bore in communication with passage 24 in body member 12 and thus in communication with bore 28 of nipple 15. Adapter 14 includes a pipe thread on its outer periphery for connection to the fluid system.

Coupling 10 is completed by first and second steel shells 16, 18 respectively. First shell 16 is generally bell-shaped or funnel-shaped and includes inner portion 35, outer portion 36 and connecting portion 38. Inner portion 35 is tubular in configuration in this embodiment of the invention, and is received in a notch on the outer periphery of body member 12, being secured by brazing or the like. Outer portion 38 is also generally tubular in shape and is supported preferably over ridge 31 on nipple 15 by bell-shaped connecting portion 38. In this manner, end 39 of shell 16 extends further axially outwardly than ridge 31.

Second shell 18 also is generally tubular in shape but of slightly less diameter than the outer portion 36 of first shell 16. Second shell 18 has inner end 40 received in the outer portion 36 of first shell 16 and supported thereby in concentric relation to nipple 15. Preferably, shell 18 is joined to shell 16 by brazing or the like to provide an integral shell structure. Outer end 41 of second shell 18 is a free end and lies generally over or in general axial alignment with free end 29 of nipple 15. An annular space 42 is thus established between second shell 18 and nipple 15 for receipt of the end of hose 11. A plurality of gripping teeth 44 are formed on the inner periphery of second shell 18, the teeth consisting of alternate grooves and projections in the surface and in this embodiment of the invention are annular ridges or rings. Alternatively, teeth 44 could comprise a spiral projection or continuous ridge extending from inner end 40 to outer end 41 or could be circumferentially discontinuous, however strength considerations are important in the latter regard. Gripping teeth 44 are projections having sloping inner and outer walls and are relatively sturdy, having approximately the same axial width as the radial thickness of second shell 18, so that a relatively rigid structure is provided. Preferably, gripping teeth 44 are symmetrically disposed on second shell 18 so that shell 18 may be assembled in first shell 16 in either direction without loss of integrity of the coupling.

As noted second shell 18 is disposed in first shell 16 so that an overlap or stacked shell section consisting of the outer end 36 of first shell 16 and the inner end 40 of second shell 18 is established. This overlap section is arranged so that at least one of the innermost 45 of the gripping teeth is axially within this section as well as annular ridge 31 on nipple 15. In the embodiment of the invention depicted in FIG. 1, innermost tooth 45 is slightly axially further inwardly than annular ridge 31. All of gripping teeth 44 project into annular space 42 and the coupling parts are sized so that the end of hose 11 may enter annular space 42 relatively freely between the outer periphery of nipple 15 and the radially inward surfaces of teeth 44.

Figure 2:
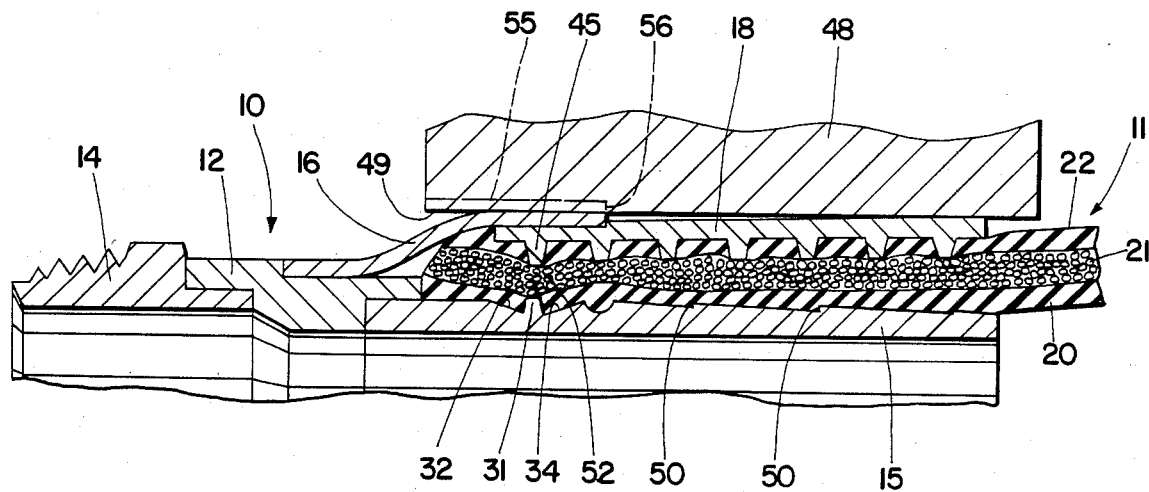
FIG. 2 is a sectional view of the coupling joint of the invention after the coupling has been crimped onto the hose.

Referring now more particularly to FIG. 2 the completed joint of the invention is depicted using the same reference numerals for corresponding parts. In completion of the joint, hose 11 has been inserted into coupling 10 until bottoming occurs between the end of hose 11 and, for example, the outer end wall of body member 12. Hose 11 is thus inserted substantially the full axial length of annular space 42 and has been inserted beyond opposed annular ridge 31 and innermost gripping tooth 45.

A collet die 48 is shown in engagement with first and second shells 16, 18 to indicate how the coupling 10 is compressed to grip and lock hose 11. Collet die 48 may be one of approximately eight dies which surround coupling 10 and which move radially inward against the collet to effect the crimp operation. In this movement collet edge 49 which is shown as a straight line generally parallel to the longitudinal axis of coupling 10, has moved radially inward, remaining parallel to the longitudinal axis of coupling 10, from a position initially contacting only first shell 16 to that shown in FIG. 2 wherein edge 49 is in contact with and has deformed both first shell 16 and second shell 18. In this movement shells 16,18 have moved radially inward and due somewhat to the collapse of first shell 16, have moved axially outward as well relative to nipple 15. This effect includes some extrusion of the material forming the shells 16,18 in the axial direction, due to the great compressing forces involved.

In this crimping movement of shells 16,18 described, gripping teeth 44 have penetrated cover 22, being dimensioned initially approximately the same or greater than the thickness of cover 22, to engage the reinforcement structure 21 of hose 11. Also during the crimping movement inner core 20 of hose 11 has been compressed into intimate engagement with the periphery of nipple 15 and in so doing causing annular ridge 31 on nipple 15 to substantially fully penetrate inner core 20 to engage or come close to engagement with reinforcement structure 21. Grooves 32,34 on either side of ridge 31 facilitate such penetration, allowing extrusion of elastomeric material forming inner core 20, therein. Further extrusion of cover 22 and core 20 material may be accommodated within inner shell 16. An effective fluid seal is thus established between inner core 20 and the outer periphery of nipple 15 and shallow annular grooves 50 are provided in the peripheral surface of nipple 15 to enhance the seal.

By virtue of the stacked shell arrangement between the outer end 36 of first shell 16 and inner end 40 of second shell 18 and the fact that collet die 48 has traversed only a radially inward, parallel movement, innermost gripping tooth 45 has moved further radially inward toward nipple 15 than has the remainder of gripping teeth 44. As depicted, innermost gripping tooth 45 has engaged reinforcement 21 and has deformed the extremely rigid structure of reinforcement 21 into a ripple 52, being enabled in this deformation by the presence of the grooves 32, 34 adjacent ridge 31. In the final position depicted in FIG. 2, hose 11 is locked in a pincer-like grip between innermost tooth 45 and annular ridge 31, and further locked by compressive engagement of the remainder of gripping teeth 44 directly upon reinforcement 21. As noted slight ripples might occur in reinforcement 21, between adjacent gripping teeth 44, however the reinforcement structure is not substantially penetrated nor detrimentally disturbed by this grip. Innermost gripping tooth 45 and annular ridge 31 are preferably in substantial axial alignment upon completion of the crimp and preferably establish a metal-to-metal contact with reinforcement 21.

Center portion 28 of nipple 15 is thicker than inner end 26, especially at grooves 32, 34, and thicker than outer free end 29 to assist in the distribution of crimping forces throughout the coupling 10 and to prevent collapse of bore 30 of the nipple 15.

While only a single innermost gripping tooth 45 has been depicted as wholly within the overlap section of first and second shells 16,18, some variation is likely possible wherein more than one of the gripping teeth 44 is positioned within the overlap section to cooperate with annular gripping ridge 31 on nipple 15. This description is intended to encompass this and other similar variations in the structures of the invention.

While collet edge 49 is depicted as a straight edge in FIG. 2 it is clear that modification could be made in the shape of this edge to modify the crimp configuration attained upon coupling 10. Thus edge 49 could include a radially outward step 55 therein, shown in dashed lines, in which outer end 36 of first shell 16 would be received. The end 39 of first shell 16 could be arranged to abut the shoulder 56 forming such step in collet 48 and thus serve as a device for locating the coupling 10 with respect to the collet die 48, to assure an accurate crimp thereon. By appropriate selection of the depth of step 55, relative to the thickness of shell 16,18, the depth of penetration of innermost gripping tooth 45 can be determined relative to the penetration of the remainder of the gripping teeth 44.

I claim:

1. A permanently attachable hose coupling for high pressure, reinforced hose having a non-skived cover and core tube, comprising
   a body member adapted for connection to a fluid system, said body member having a passage therein for flow of hydraulic fluid,
   a nipple affixed on said body member, said nipple being of generally tubular configuration having a bore therein in fluid communication with said passage in said body member, said nipple extending outwardly from said body member and having an inner end and an outer free end,
   an annular ridge on the periphery of said nipple, said ridge being spaced axially outwardly from said inner end of said nipple,
   a first shell affixed on said body member, said first shell being a thin wall member having an inner section supported on said body member, an outer section of generally tubular configuration and a connecting section joining said inner and outer sections, said outer shell section surrounding said inner end of said nipple and said annular ridge thereon,
   a second shell affixed to and supported by said first shell, said second shell being of generally tubular configuration and surrounding said nipple to form an annular space therebetween, said second shell having alternate grooves and projections on the inner periphery thereof forming teeth for gripping hose inserted in said annular space, said teeth being of a radial dimension to substantially freely receive said reinforced hose in said annular space, said second shell being partly received in said first shell to form an overlapping shell band, said shell band being of less axial extent than said second shell, said second shell extending axially outwardly of said first shell and having said projections therein axially outwardly of said first shell, and at least one of said projections being axially disposed in said shell band.

2. The hose coupling set forth in claim 1 wherein said shell band is disposed over said annular ridge.

3. The hose coupling set forth in claim 2 wherein said one projection is disposed axially inwardly of said annular ridge.

4. The hose coupling set forth in claim 2 wherein said one projection is disposed in substantial axial alignment with said annular ridge.

5. The hose coupling set forth in claim 2 wherein said one projection is annular.

6. The hose coupling set forth in claim 5 wherein said alternate grooves and projections are a series of rings on the inner periphery of said second shell.

7. The hose coupling set forth in claim 6 wherein said rings are symmetrically disposed on said second shell so that said second shell may be assembled in said coupling in either direction.

8. The hose coupling set forth in claim 7 wherein said annular space is sufficiently large to receive the free end of hydraulic hose to be coupled thereto, which free hose end has an inner tube, wound reinforcement thereover and an elastomeric cover.

9. The hose coupling set forth in claim 2 wherein said connecting section of said first shell is bell-shaped and interconnects a smaller diameter inner section and a larger diameter outer section.

10. A hose coupling joint comprising,
high pressure hose having an elastomeric core tube, plural wire reinforcement layers wound over said core tube and an elastomeric cover over said reinforcement layers,
a body member adapted for connection to a hydraulic system, said body member having a fluid passage therein,
a tubular nipple on said body member in communication with said fluid passage, said nipple having a free end remote from said body member inserted in said core tube and a peripheral annular ridge substantially completely embedded in said core tube,
a first shell member supported on said body member, said first shell member having an outer end disposed over said annular ridge on said nipple,
a second shell member of generally tubular configuration partially inserted in said first shell member forming an overlap section of said first and second shell members, said overlap section overlying said annular ridge, and axially spaced gripping teeth on the inner periphery of said second shell, said overlap section being of less axial extent than said second shell member, said second shell member extending axially outwardly of said first shell member and having gripping teeth therein axially outwardly of said first shell member, said gripping teeth being embedded in said hose cover and being in engagement with said wire reinforcement, at least one of said gripping teeth being in said overlap section and being further radially inwardly disposed than the remainder of said gripping teeth axially outwardly of said first shell member.

11. The coupling joint set forth in claim 10 wherein said wire reinforcement is distorted into a ripple at said overlap section and said at least one of said gripping teeth is disposed in a trough of said ripple.

12. The coupling joint set forth in claim 10 wherein said at least one of said gripping teeth and said annular ridge are in engagement with said wire reinforcement.

13. The coupling joint set forth in claim 10 wherein said at least one of said gripping teeth is disposed in axial alignment and radially outwardly of said annular ridge.

14. The coupling joint set forth in claim 10 wherein said nipple includes a groove on either side of said annular ridge, thereby forming a reduced wall thickness of said nipple, said nipple having further grooves axially outwardly of said annular ridge and a relatively thick wall section in the region of said further grooves.

15. The coupling joint set forth in claim 14 wherein said nipple has a greater wall thickness at a central location at which said further grooves are located, than at the location at which said grooves adjacent said ridge are located and at the remote end thereof.

16. The coupling joint set forth in claim 10 wherein said shells are brazed together.

17. In combination with a flexible hose having a core tube, wire reinforcement thereover and an elastomeric cover, a hose coupling comprising
a tubular nipple having an outer end inserted in said core tube, an inner end and an outer surface between said ends in engagement with the inner periphery of said core tube,
an annular ridge in said nipple outer surface adjacent said inner end thereof,
an annular groove in said nipple outer surface on either side of said ridge, said annular ridge substantially completely penetrating said core tube for substantial engagement with said wire reinforcement, said annular grooves receiving said core tube therein,
body member means at the inner end of said nipple for supporting said nipple, said body member means having a fluid passage therein in communication with the interior of said nipple and adapted for connection to a hydraulic system, and
a generally tubular shell structure affixed to said body member and disposed about said hose in axial alignment with said nipple outer surface and forming an annular space in which said hose is received,
a plurality of axially spaced inner and outer gripping teeth on the inner surface of said shell structure projecting radially inwardly into said annular space substantially completely through said hose cover and into direct engagement with said wire reinforcement, an inner gripping tooth of said shell structure being positioned in substantial axial alignment with said annular ridge of said nipple and projecting further radially inwardly than said outer gripping teeth to assure gripping of said reinforcement between said inner tooth and said annular ridge, said outer gripping teeth compressing said core tube therebelow into sealing engagement with said outer surface of said nipple.

18. The combination set forth in claim 17 wherein said gripping teeth have substantially the same radial dimension and further comprising means on said shell structure for effecting the further radially inward projection of said inner gripping tooth.

19. The combination set forth in claim 18 wherein said shell structure means comprises a thickened section of said shell structure in substantial axial alignment with said inner tooth and said annular groove.

20. The combination set forth in claim 19 wherein said shell structure comprises first and second shells, the inner end of said second shell being disposed in the outer end of said first shell to form said thickened section, said gripping teeth being disposed on said second shell.

21. The combination set forth in claim 20 wherein said gripping teeth are symmetrically disposed on said second shell.

* * * * *